US006555926B2

(12) United States Patent
Gondron

(10) Patent No.: US 6,555,926 B2
(45) Date of Patent: Apr. 29, 2003

(54) PULSER

(75) Inventor: Woodrow Gondron, Loreauville, LA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/967,001

(22) Filed: Sep. 28, 2001

(65) Prior Publication Data

US 2003/0062724 A1 Apr. 3, 2003

(51) Int. Cl.[7] .................................................. F02C 6/18
(52) U.S. Cl. ........................ 290/1 R; 340/856.3; 175/48
(58) Field of Search ....................... 290/1 R; 340/856.3; 175/48

(56) References Cited

U.S. PATENT DOCUMENTS

| | | | | | |
|---|---|---|---|---|---|
| 3,958,217 | A | * | 5/1976 | Spinnler | 367/83 |
| 3,997,867 | A | * | 12/1976 | Claycomb | 367/83 |
| 4,276,943 | A | * | 7/1981 | Holmes | 175/40 |
| 4,596,293 | A | * | 6/1986 | Wallussek et al. | 340/853.6 |
| 4,825,421 | A | * | 4/1989 | Jeter | 367/83 |
| 5,215,152 | A | * | 6/1993 | Duckworth | 175/48 |
| 5,449,249 | A | * | 9/1995 | Husten | 405/128.15 |
| 5,586,083 | A | * | 12/1996 | Chin et al. | 367/84 |
| 5,586,084 | A | * | 12/1996 | Barron et al. | 367/85 |
| 5,787,052 | A | * | 7/1998 | Gardner et al. | 367/84 |
| RE36,401 | E | * | 11/1999 | Fitzpatrick et al. | 73/300 |
| 6,469,637 | B1 | * | 10/2002 | Seyler et al. | 340/856.3 |

FOREIGN PATENT DOCUMENTS

| | | | | | |
|---|---|---|---|---|---|
| WO | WO 9919594 | A1 | * | 4/1999 | E21B/4/04 |

* cited by examiner

*Primary Examiner*—Joseph Waks
(74) *Attorney, Agent, or Firm*—Cantor Colburn LLP

(57) ABSTRACT

A pulser providing pressure based accoustic telemetry in a fluid column includes a formed turbine and valve wheel moveable as one unit, an aft turbine configured to drive the valve wheel and a brake to inhibit movement of the aft turbine. During periods when the aft turbine is slowed relative to the formed turbine and valve wheel, the aft turbine blocks misalign with blades of the valve wheel inhibiting fluid flow therepast. A pressure buildup is caused hereby until the brake is released allowing the aft turbine blades to realign with the valve wheel by resuming speed rotation thereby terminating pressure buildup.

27 Claims, 6 Drawing Sheets

12
14
16
18
20
22
24
26
28
30
32
34
36
38
40
42
44
46
48
50
52
54
56
58
60
62
64
66
68
70
72
74
76

PULSER

BACKGROUND

The desire for more information is pervasive in virtually every discipline. In the case of transport of fluid from a distant source in a fluid column, information about any number of things occurring distantly or the ability to communicate through the fluid column distant locations is desirable. While this is particularly true in the oil and gas industry it is generally applicable in any such fluid column systems.

SUMMARY

A pulser comprises a first turbine and valve wheel and a second turbine rotationally moveable selectively with or relative thereto to create flow restriction and constant pressure increase for a selected period of time. A method for pulsing and communication in a fluid column comprising spinning at two turbine system in an aligned condition; selectively misaligning said system for a selected period of time and allowing said system to realign.

DETAILED DESCRIPTION

The pulser operates to cause a pressure buildup within the fluid column for a discrete period of time through selective misalignment of a valve wheel with another valve wheel or a turbine. A buildup of pressure is caused by the misalignment of the valve. The pressure buildup is propagated through the fluid column from its point of origin at the valve and is detectable at a distant location. The discrete pressure buildup is known in the vernacular as a "pulse". A series of pulses with timed intervals are readable as a message.

Figure 1:
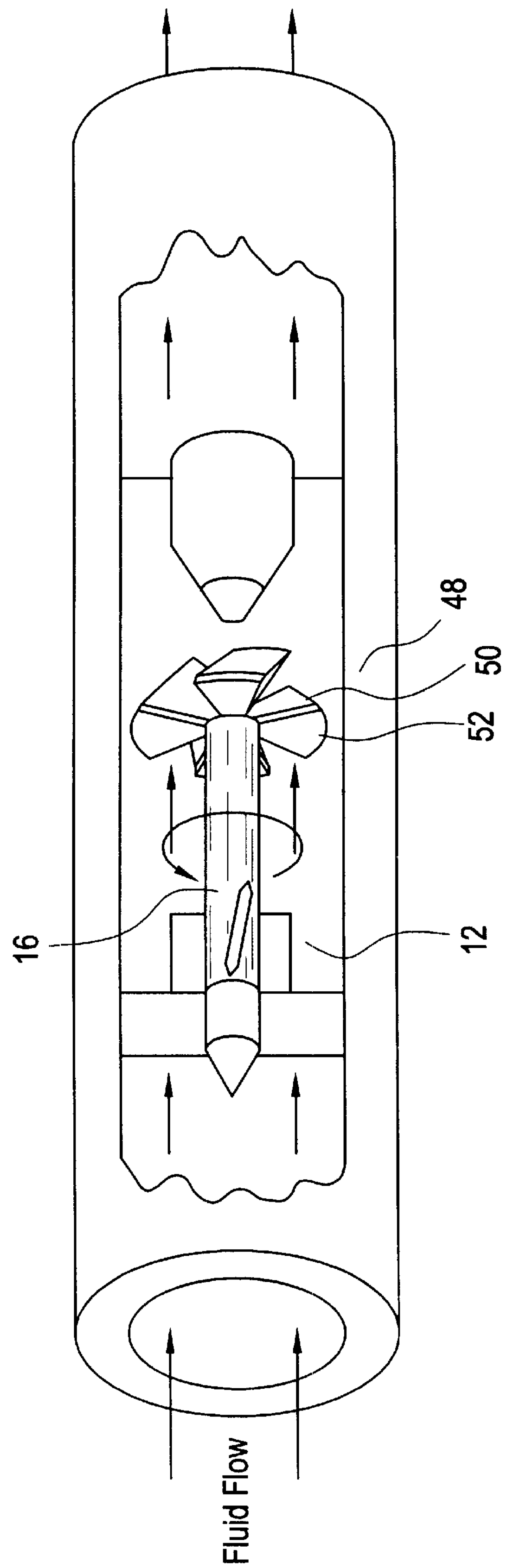
FIG. 1 is a schematic perspective view of a pulser in a flow unrestricted (aligned) configuration.
Figure 2:
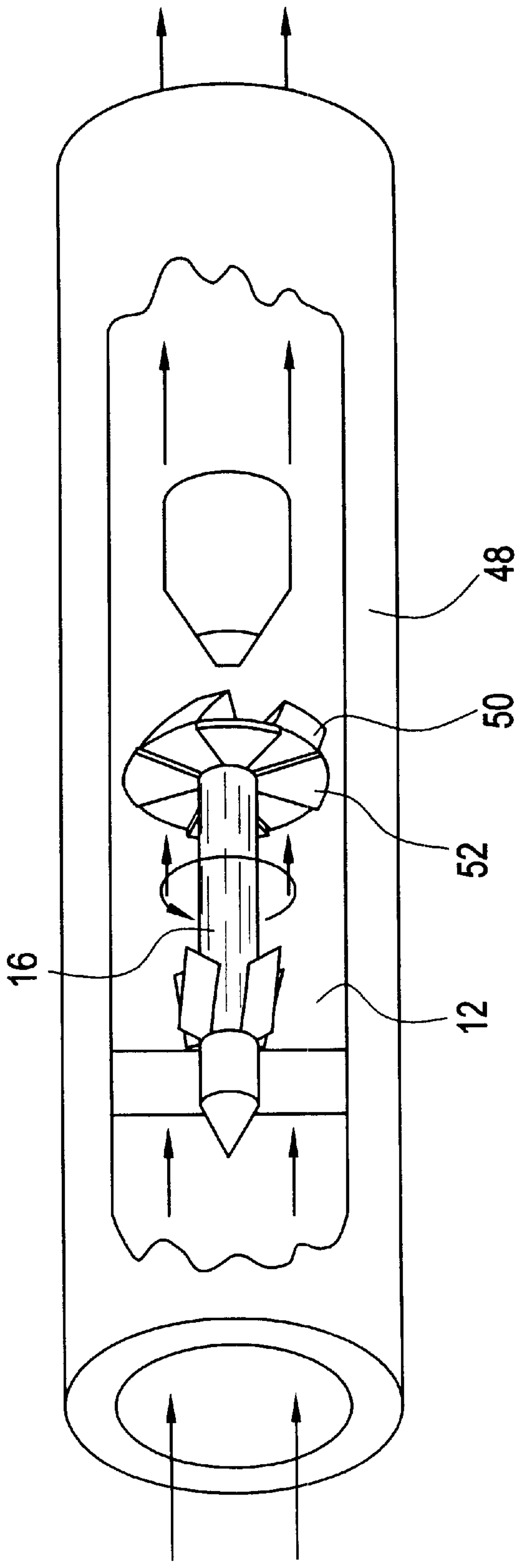
FIG. 2 is a schematic perspective view of the pulser in a flow restricted (misaligned) configuration.

With reference to FIGS. 1 and 2, the pulser in the valve open or aligned position and in the valve closed or misaligned position, respectively, are illustrated. One of skill in the art will appreciate that in the FIG. 2 (misaligned) position, a pressure buildup is created. The misalignment of the valve is the beginning of a pulse which ends upon the valve being realigned.

Referring to FIGS. 3*a*–3*d*, the components of the pulser are illustrated in exploded form and hereunder described. For purposes of discussion it is assumed that fluid will flow from the left side of each of the drawings to the right side of each of the drawings. It will be understood through that the flow could be reversed.

Figures 3A, 3B, 3C, 3D:
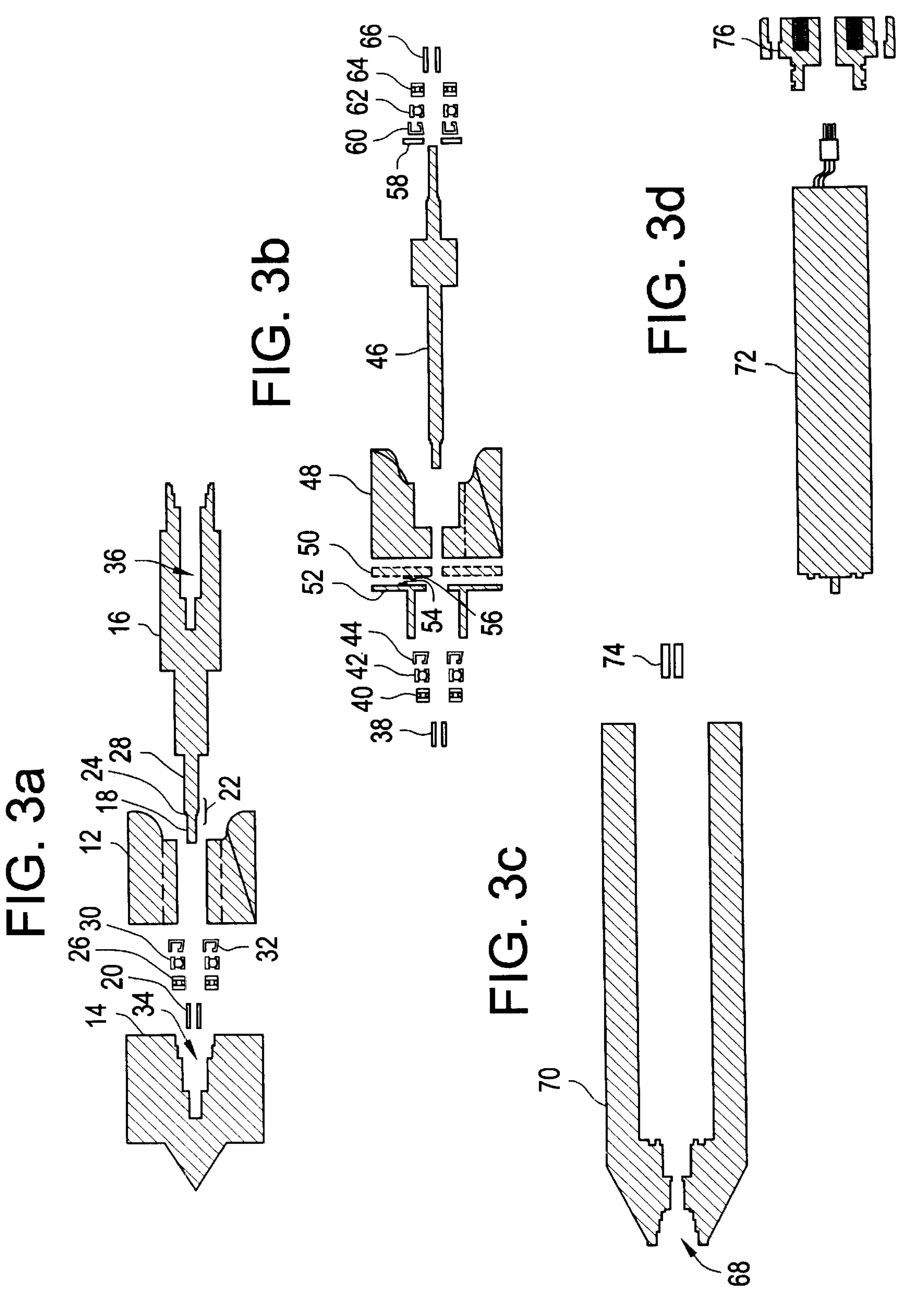
FIGS. 3*a*–3*d* are an exploded view of the pulser.

Referring to FIG. 3*a*, components for operability of forward turbine 12 are illustrated. Forward support 14 is configured to be receivable in a tubular member (not shown) such that support may be provided to a forward shaft 16 upon which forward turbine 12 is supported. Forward shaft 16 includes a bushing nose 18 sized and configured to nest with a bushing 20 which may be of a bronze material or other suitable supportive yet lubricious material. A double shoulder 22 defines a thrust bearing land 24 to be received in thrust bearing 26. Bearing area 28 is received in bearing 30 which may be a roller bearing or other suitable bearing for the intended environment. It is noted that this bearing may be mud cooled when the device is utilized in a hydrocarbon well or may be oil bathed. If oil bathed then a seal 32 is also desirable to maintain a delineation between the bathing oil and the surrounding fluid. It will be appreciated from the figure, by one of ordinary skill in the art, that support 14 provides a stepped recess 34 wherein bushing 20, thrust bearing 26, bearing 30 and seal 32 are received to provide support for forward shaft 16.

Upon forward shaft 16 is mounted forward turbine 12. Turbine 12 is mounted thereon by means of a splined connection or other similar positive connection limiting relative rotational movement therebetween.

Still referring to FIG. 3*a*, but now bridging to FIG. 3*b*, forward shaft 16 includes an ID profile 36 intended to receive a bushing 38, thrust washer 40, bearing 42 and seal 44 (optional) in a manner similar to that of front support 14. The support set 38, 40, 42 and 44 receive and support inner shaft 46 by receiving that shaft in a manner similar to the receipt by front support 14 of shaft 16 in FIG. 3*a*.

Inner shaft 46 supports aft turbine 48 thereon in a rotationally inhibited arrangement such as a splined connection or other similarly acting connection. At one end of aft turbine 48 (left in the drawing) is an aft valve wheel 50 which has an end view similar to that of the aft turbine such that alignment of the valve wheel 50 with aft turbine 48 can be accomplished. In one embodiment both the aft turbine 48 and aft valve wheel 50 possess four blades each, each blade occupying 45° of arc and defining a space of 45° of arc therebetween. Aft valve wheel may be advantageously constructed of a hard material to reduce flow cutting thereof and to additionally protect aft turbine 48. Aft valve wheel 50 is rotationally affixed to aft turbine 48 and is maintained in proximity therewith. It will be appreciated that aft valve wheel 50 may be omitted with aft turbine 48 assuming the function of wheel 50. In such event, consideration of resistance to flow cutting of turbine 48 should be given and suitable material resistant thereto employed.

Still referring to FIG. 3*b*, forward valve wheel 52 is positioned proximate and coaxially with aft valve wheel 50 (or aft turbine 48 in the event wheel 50 is omitted). Moreover, forward valve wheel 52 is configured to rotate with forward shaft 16 and thereby forward turbine 12. Forward valve wheel 52 is configured to have blades substantially equivalent in number, size and configuration to aft valve wheel 50 to facilitate alignment and thereby low flow restriction when desired. It is further desirable to provide forward stop 54 and aft stop 56 whose functions will be discussed hereunder.

Returning to inner shaft 46, the not-hereinbefore-discussed end (right end in drawing) of shaft 46 is provided with a profile sufficient to nest with a support set including retainer 58, seal 60, bearing 62, thrust bearing 64 and bushing 66 which are substantially similar to the support sets hereinbefore discussed with the exception of retainer 58 which ensures that the other members of this support set are reliably retained in stepped recess 68 of brake housing 70 (see FIG. 3*c*) wherein the second discussed end of inner shaft 46 is received and supported.

Referring to FIG. 3*c*, brake housing 70 is configured to be receivable in a tubular (not shown), which may be a hydrocarbon well tool, in such manner that housing 70 is non-rotatable with respect to said tubular. Within housing 70 is a brake mechanism 72 (FIG. 3*d*) which may be an electric brake. The brake may be a brushless dc motor operating as a generator with one or more relay circuits (not shown) actuatable to short the phases of the motor on command. It will be appreciated that the brake mechanism need merely have the capability to reduce the attained rotational speed of the aft turbine 48, due to fluid flow therepast, to below the speed of the forward turbine 12 to effect relative rotation of forward valve wheel 52 to aft valve wheel 50 and thereby at least partial restriction of fluid flow therepast. In one embodiment a brushless dc motor operating in generator mode is selected to achieve the advantage that no current is required to operate the brake. Rather, merely a 5 volt signal need be communicated to the brake to obtain the desired result. As illustrated, inner shaft 46 is coupled to brake mechanism 72 by shaft coupling 74. An end cap 76 may be provided to secure and protect brake mechanism 72.

Figure 4A:
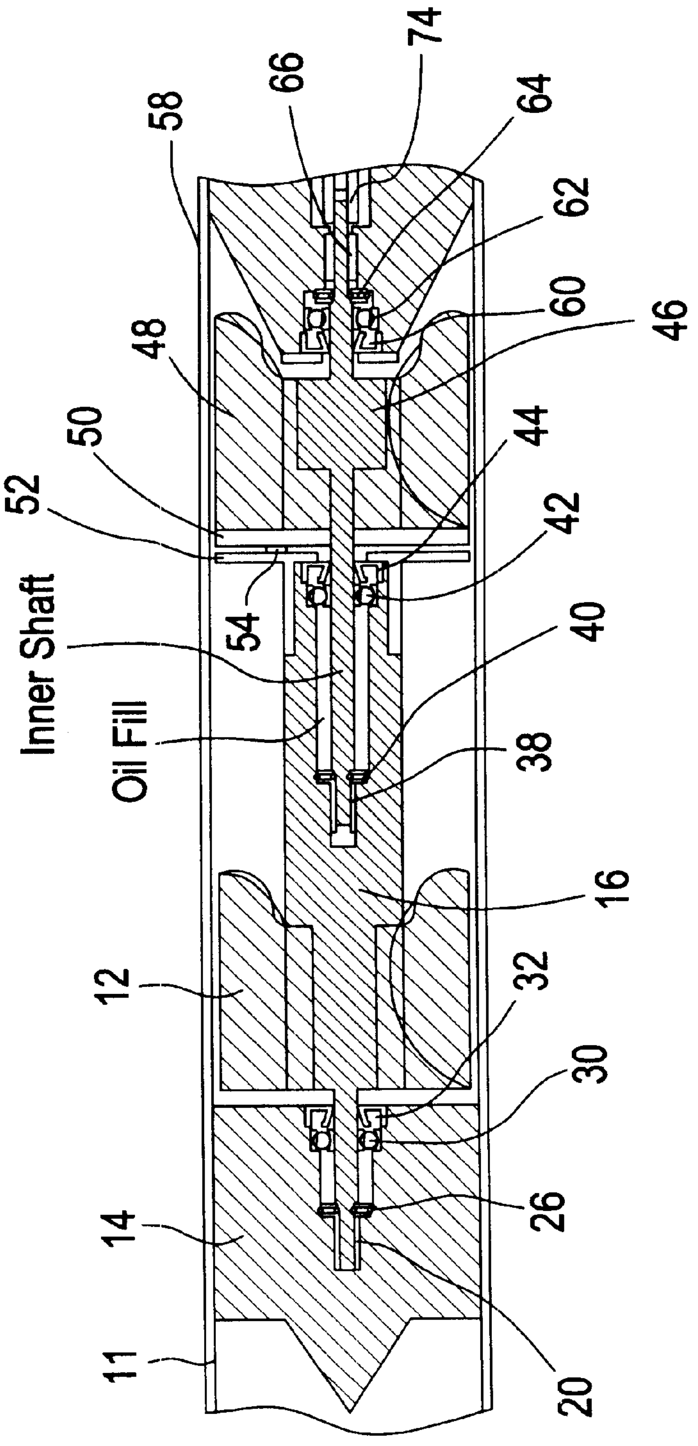
FIGS. 4*a*–4*b* are a view of the components of the pulser in an assembled condition.
Figure 4B:
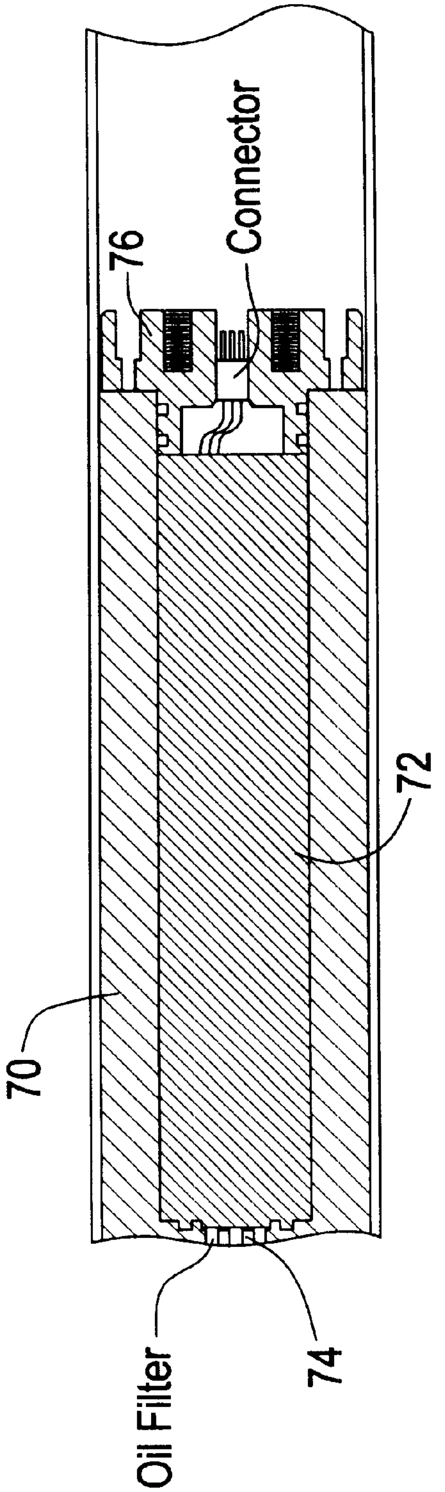

Each of the components discussed relative to the exploded view of FIGS. 3*a*–3*d* are also illustrated and identically numbered in FIGS. 4*a* and 4*b* to further enhance understanding of the illustrated embodiment of the pulser.

The forward turbine 12 and aft turbine 48 are configured with specific pitches relative to one another that are calculated to produce the desired effect of the aft turbine 48 driving the forward turbine 12 under valve open (aligned) conditions. This is achieved in one embodiment by configuring the aft turbine 48 with a greater pitch than that of forward turbine 12. The greater the pitch of a turbine, the faster that turbine will spin incident to fluid flowing thereover. Since the aft turbine 48 in this embodiment is of greater pitch than the forward turbine 12, the aft turbine will spin faster than does the forward turbine 12 for a given flow through the system. Thereby the aft turbine necessarily drives the forward turbine 12. Since, as is visible in FIG. 4*a*, stops 54 and 56 overlap in the assembled configuration of the device the more rapidly spinning aft turbine 48 will necessarily provide a driving force to forward valve wheel 52, forward shaft 16 and forward turbine 12, which as noted above are rotationally affixed to one another. Placement of stops 54 and 56 is such that when the forward components identified are driven by aft turbine 48, all blades of the valve wheels are aligned and the least restriction to fluid flow is presented.

When a pulse is desired, brake mechanism 72 is engaged causing a torque to be loaded onto inner shaft 46 thereby slowing aft turbine 48 (and aft valve wheel 50, which is affixed thereto rotationally, if included). It is desirable that the torque loading available be sufficient in view of the inertial mass of inner shaft 46, aft turbine 48, valve wheel 50 and drag forces between valve wheel 50 and valve wheel 52, to rapidly slow aft turbine 48. It is helpful to reduce the mass of these components as is practical to reduce necessary brake torque. It is desirable to slow aft turbine 48 rapidly to a speed below that of forward turbine 12 so that forward valve wheel 52 will rapidly misalign with aft valve wheel 50 which begins a pulse due to restriction in the flow path. In one embodiment, the degree of misalignment obtained is limited to about 22.5°. It has been found that this degree of misalignment in this embodiment is sufficient to create pressure rise in the flowing fluid while still allowing enough fluid to pass through the valve wheel aft turbine misalignment to cause the aft turbine to spool up again upon release of the brake mechanism. It will be understood however that any degree of misalignment provides some degree of pressure rise. Depending upon sensitivity of receiving equipment for a pulse the misalignment may be lesser or greater as desired.

Since the aft turbine spins more quickly than the forward turbine 12, the tendency is for aft turbine 48 to drive aft valve wheel 50 into alignment with the forward valve wheel 52 marking the end of that discrete pulse. The width of the pulse is controllable by the time during which the brake mechanism is activated. It should be noted that to enhance the operation of the illustrated embodiment, the valve wheels are advantageously made thin to reduce hydraulic opening forces which are an impediment to rapid misalignment of the valve wheels.

Figure 5:
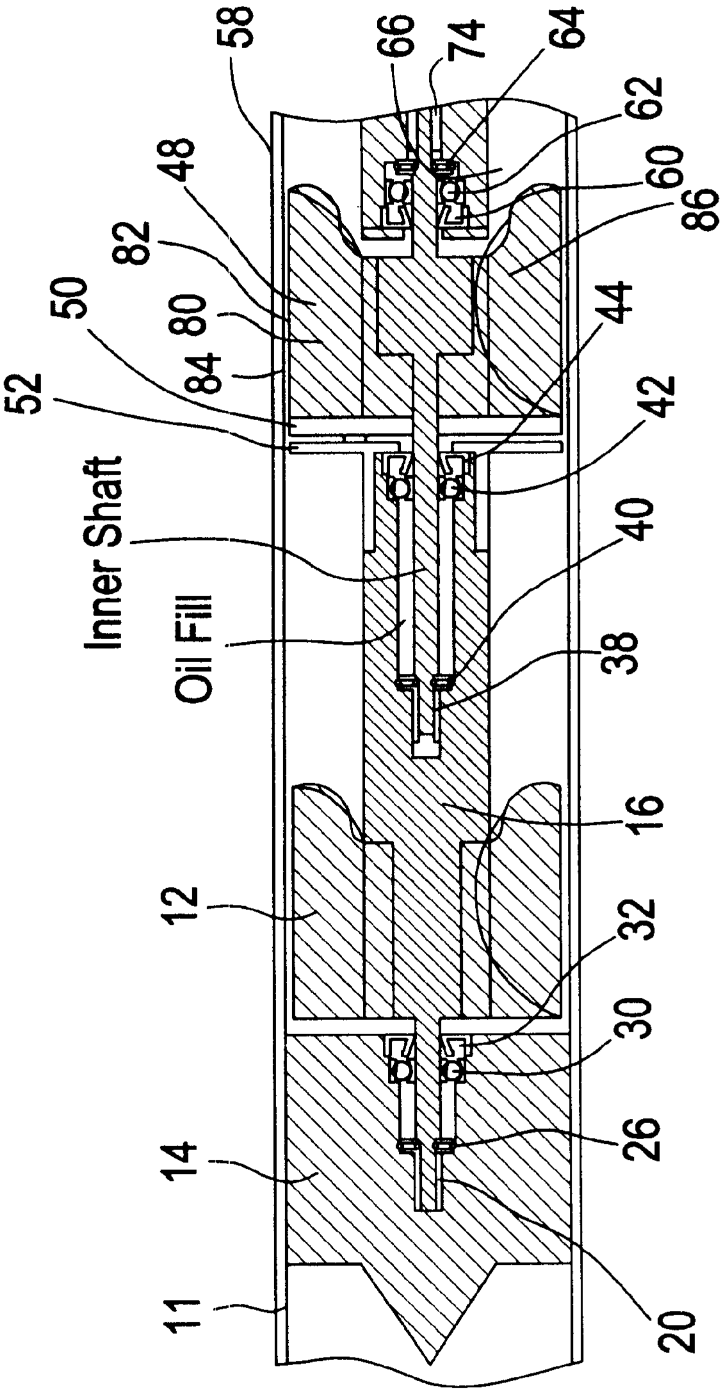
FIG. 5 is an alternate embodiment of the pulser.

In an alternate embodiment, schematically illustrated in FIG. 5, the aft turbine 48, brake housing 70 and brake mechanism 72 of FIGS. 3 and 4 are collapsed to reduce components and length of the assembled tool. In this embodiment aft turbine 80 is itself a rotor. A housing 82 is disposed outwardly of turbine 80 and includes coils 84. Turbine 80 includes magnets 86. These components, it will be understood comprise a generator when in a shorted phase condition. The turbine may be slowed by activation of the coils with results similar to the foregoing embodiment.

While preferred embodiments have been shown and described, various modifications and substitutions may be made thereto without departing from the spirit and scope of the invention. Accordingly, it is to be understood that the present invention has been described by way of illustration and not limitation.

What is claimed:

1. A pulser comprising:
- a first turbine;
- a valve wheel connected to said first turbine;
- a second turbine selectively rotatable relative to said first turbine; and
- a brake selectively actuatable to slow rotation of one of said first turbine or said second turbine relative to the other of said first turbine or said second turbine.

2. A pulser as claimed in claim 1 wherein said brake is sufficient to slow said rotation of said first turbine or said second turbine to below a rotation speed of the other of said first turbine or said second turbine.

3. A pulser as claimed in claim 1 wherein said first turbine has a blade pitch different from said second turbine.

4. A pulser as claimed in claim 3 wherein said second turbine possesses a more aggressive blade pitch than said first turbine.

5. A pulser as claimed in claim 1 wherein said second turbine further includes a second valve wheel rotationally affixed in aligned relationship to said second turbine.

6. A pulser as claimed in claim 1 wherein said brake is an electric brake.

7. A pulser as claimed in claim 1 wherein said brake is a dc brushless generator.

8. A pulser as claimed in claim 7 wherein said generator is actuated by a signal received by at least one relay circuit configured to short phases of the generator.

9. A pulser as claimed in claim 7 wherein said generator is oil filled.

10. A pulser comprising:
- a first valve wheel driven by a first turbine;
- a second valve wheel driven by a second turbine, said first valve wheel and said second valve wheel being rotatable in an aligned configuration and selectively rotatably relative to each other to assume a misaligned configuration.

11. A pulser as claimed in claim 10 wherein said pulser further includes a brake which when activated enables said first valve wheel and said second valve wheel to assume said misaligned configuration.

12. A pulser as claimed in claim 11 wherein at least one of said first turbine and said second turbine are driven solely by fluid flowing thereover.

13. A pulser as claimed in claim 11 wherein both of said at least one of said first turbine and said second turbine are driven solely by fluid flowing thereover.

14. A pulser as claimed in claim 11 wherein said brake is a dc brushless generator.

15. A pulser as claimed in claim 10 wherein each of said first valve wheel and said second valve wheel include a stop limiting relative motion therebetween.

16. A pulser as claimed in claim 10 wherein said first valve wheel and said second valve wheel are configured to misalign about 22.5° by a portion of a blade width.

17. A pulser as claimed in claim 10 wherein said first valve wheel and said second valve wheel are configured to misalign about 22.5°.

18. A pulser as claimed in claim 10 wherein about ½ a blade width of a blade of said wheel.

19. A pulser as claimed in claim 10 wherein each of said first valve wheel and said second valve wheel include four blades each blade occupying about 45° of arc and defining therebetween spaces of about 45° of arc.

20. A pulser as claimed in claim 19 wherein said generator employs said second turbine as a rotor.

21. A pulser as claimed in claim 10 wherein said misaligned configuration is only partially misaligned.

22. A method for pulsing in fluid column comprising:

spinning a two turbine system having a flow restrictor in an aligned condition;

braking one of the two turbines to misaligned said system causing a flow restriction; and allowing said system to realign relieving said flow restriction.

23. A pulser as claimed in claim 22 wherein said spinning is caused soley by fluid flowing over said system.

24. A pulser as claimed in claim 22 wherein said braking comprises shorting phases of a generator to lead said one of the two turbines.

25. A method for communicating through a fluid column comprising:

spinning a two turbine system having a flow restrictor in an aligned condition;

braking one of the two turbines to misaligned said system causing a flow restriction;

allowing said system to realign relieving said flow restriction; and repeating said braking and allowing a number of times to create a message.

26. A method for communicating through a fluid column as claimed in claim 25 wherein said braking and allowing include a selected time interval.

27. A method for communicating through a fluid column as claimed in claim 26 wherein said allowing and repeating include a selected time interval.

* * * * *